(12) United States Patent
Halling et al.

(10) Patent No.: US 6,446,978 B1
(45) Date of Patent: Sep. 10, 2002

(54) RESILIENT SEALING RING

(75) Inventors: Horace P. Halling, Durham, CT (US); Paul L. Porter, Colbert, WA (US)

(73) Assignee: Jetseal, Inc., Spokane, WA (US)

( * ) Notice: Subject to any disclaimer, the term of this patent is extended or adjusted under 35 U.S.C. 154(b) by 0 days.

(21) Appl. No.: 09/863,353

(22) Filed: May 24, 2001

Related U.S. Application Data (63) Continuation of application No. 09/228,292, filed on Jan. 11, 1999, now Pat. No. 6,257,594.

(51) Int. Cl.[7] .............................................. F16J 15/02
(52) U.S. Cl. ...................... 277/626; 277/614; 277/644; 277/647; 277/314
(58) Field of Search ................................ 277/604, 614, 277/626, 644, 647, 643, 314

(56) References Cited

U.S. PATENT DOCUMENTS

| | | |
|---|---|---|
| 1,609,283 A | 12/1926 | Bailey |
| 1,661,878 A | 3/1928 | Cromwell |
| 1,770,548 A | 7/1930 | Oven |
| 1,985,475 A | 12/1934 | Victor |
| 2,315,588 A | 4/1943 | Brickman ....................... 94/18 |
| 2,819,920 A | 1/1958 | Snyder et al. ................. 228/30 |
| 2,898,000 A | 8/1959 | Hanny ......................... 220/46 |
| 3,217,922 A | 11/1965 | Glasgow ....................... 220/46 |
| 3,411,763 A | 11/1968 | Blackman et al. ............. 266/5 |
| 3,554,567 A | 1/1971 | Carroll et al. ............... 277/164 |
| 3,575,432 A | 4/1971 | Taylor ..................... 277/206 R |
| 3,588,131 A | 6/1971 | Nicholson ................... 277/206 |
| 3,713,660 A | 1/1973 | Luthe ..................... 277/206 R |
| 3,749,063 A | 7/1973 | Buffum ........................ 119/61 |
| 3,879,043 A | 4/1975 | Tozer .......................... 277/163 |
| 4,218,067 A | 8/1980 | Halling ........................ 277/205 |
| 4,602,888 A | 7/1986 | Court et al. ................... 403/28 |
| 4,744,572 A | 5/1988 | Sahba et al. ................. 277/236 |
| 4,832,353 A | 5/1989 | Nicholson ................... 277/205 |
| 4,850,521 A | 7/1989 | Servant ..................... 277/167.5 |
| 4,915,397 A | 4/1990 | Nicholson ............... 277/206 R |
| 4,946,174 A | 8/1990 | Usui ........................... 277/199 |
| 5,125,796 A | 6/1992 | Cromer .................... 415/174.2 |
| 5,247,918 A | 9/1993 | Wakeman ................... 123/470 |

*Primary Examiner*—Anthony Knight
*Assistant Examiner*—Enoch Peavey
(74) *Attorney, Agent, or Firm*—Baker & Hostetler LLP (57) ABSTRACT

A resilient seal has an annular curved region having a generally C-shaped cross section, and a pair of annular leg regions. Each leg region has a free end and extends generally radially inward towards the inside of the C-shaped cross section. The leg regions contact each other and each form a generally frustro-conical disk spring member extending inwardly from the curved region. The leg regions are adapted to contact each other and to provide a restoring force when the sealing ring is compressed. A first bend connects one of said leg regions to the curved region, and a second bend connects the other of the leg regions to the curved region.

5 Claims, 9 Drawing Sheets

RESILIENT SEALING RING

This application is a continuation of application Ser. No. 09/228,292 filed Jan. 11, 1999, now U.S. Pat. No. 6,257,594.

FIELD OF INVENTION

The invention relates to a resilient seal. The invention pertains to pressure-energized resilient seals generally suitable for high pressure, high temperature gas applications in which virtually hermetic sealing may be accomplished, combined with the ability to maintain sealing efficiency while mating sealing members undergo separating deflections. Seals according to the present invention can be made so as to be suitable for sealing liquid/gas fuel rocket motor nozzles and cases, jet engine component interfaces, nuclear pressure vessels and high vacuum systems.

BACKGROUND OF INVENTION

Resilient metallic sealing rings of C-shaped cross-section are widely known and used in numerous applications where relatively low leakage rates are allowable. To obtain a hermetic seal in vacuum and high pressure gas applications, however, it has heretofore been the common practice to reinforce the sealing force developed by the seal upon compression by the use of additional components, such as internal helically-wound toroidal "garter" springs (see U.S. Pat. No. 2,819,920) reverse facing concentric layers (see U.S. Pat. No. 4,218,067) or "resilience control members" (see U.S. Pat. No. 4,946,174).

Figure 2A:
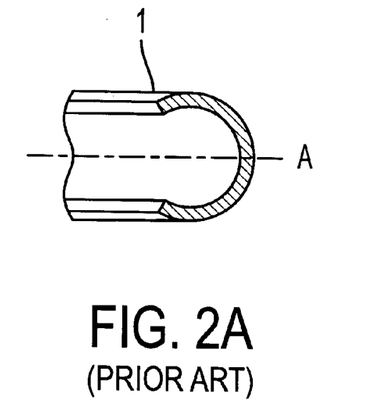
FIG. 2A is a side sectional cutaway view of a prior art C-shaped sealing ring.
Figure 2B:
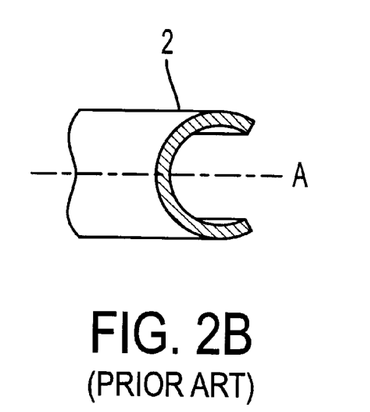
FIG. 2B is a side sectional cutaway view of another prior art C-shaped sealing ring.

FIGS. 2A and 2B depict a prior art C-shaped seals 1 and 2. Compression of the cross section of these seals induces meridional bending stresses reaching a maximum value on the axis of symmetry of the cross-section, indicated by the line labeled A. As compression increases from initial contact to a nominal 20% of the seal free or original height, where the maximum sealing contact force consistent with safe operation is obtained, the area of the cross-section in which the stress has surpassed the yield stress gradually extends until it approaches a fully-soaked condition over nearly the entire cross-sectional area at line A. Because only a small area of the cross-section, if any, at line A remains in an elastic state, the degree of springback obtained when the compression force is removed is reduced. A different shape of C-seal is shown in U.S. Pat. No. 3,879,043, which discloses a C-shaped seal having inwardly turned ends. However, the shape of these ends make them subject to crushing, also causing a reduction in springback.

One commonly used reinforced C-shaped seal is that which employs a helically-wound, toroidal "garter" spring nested inside the C-shaped cross-section of the sealing ring. An advantage of this arrangement is that it reinforces the sealing contact stress, thereby reducing leakage by increasing deformation of the seal material or coating at the sealing interfaces. A disadvantage is that in high pressure applications, the stiffness of the toroidal spring must be sufficient to overcome the stiffness of the C-shaped shell, which in turn must be thick enough to resist severe deformation and rupture by the pressure to be contained. The result is a seal with very little more springback than the plain C-shaped seal which it replaces and one which undergoes severe and debilitating stress relaxation—reducing both sealing force and springback—especially at elevated operating temperatures.

The importance of springback and the maintenance of sealing load are paramount in elevated temperature sealing of relatively flexible pressure containment structures such as rocket motors and jet engines. At operating pressures and temperatures, the joints sealed by resilient metallic seals usually experience a widening of the distance between their sealing faces, due to the effects of pressure forces and a reduction in the modulii of elasticity of their materials. Pressure-energization of segmental toroidal shell sealing elements provides partial recovery of their pre-compressed (pre-installed) dimensions, thereby tending to maintain the required sealing force. In many cases, however, this is insufficient to expand the seal cross-section beyond its natural springback recovery to ensure continued sealing as separation increases.

SUMMARY OF INVENTION

In the background description above, it has been demonstrated that a need exists for low-leakage sealing rings with improved springback. The present invention addresses this need, in the form of a one-piece, integral sealing ring, with improved springback and sealing efficiency.

In one aspect, the invention provides a sealing ring, comprising an annular curved region having a generally C-shaped cross section and a pair of annular leg regions. A first bend connects one of said leg regions to the curved region, and a second bend connects the other of the leg regions to the curved region. Each said leg region has a free end and extends generally radially inward towards the inside of the C-shaped cross section.

In another aspect, the invention provides a sealing ring, comprising an annular curved region having a generally C-shaped cross section and a pair of annular leg regions extending from the C-shaped cross section generally radially inwards towards the inside of the C-shaped cross section. When the seal is compressed, an internal stress area exists in each leg region which has a stress greater than a maximum stress present in the curved region.

In yet another aspect, the invention provides a sealing ring, comprising an annular curved region having a generally C-shaped cross section, and a pair of generally frustro-conical spring members extending inwardly from said curved region. The spring members are adapted to contact each other and to provide a restoring force when the sealing ring is compressed.

DETAILED DESCRIPTION OF THE PREFERRED EMBODIMENTS

Figure 1A:
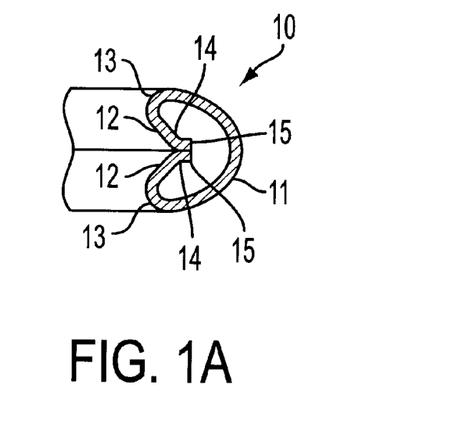
FIG. 1A is a side sectional cutaway view of a sealing ring according to a preferred embodiment of the present invention.

Referring now to a preferred embodiment of the invention depicted in FIG. 1A, a sealing ring embodies a generally C-shaped cross-section with the ends at which the C normally terminates having legs that extend radially inwards, towards the geometric center of the circular C cross-section and, thus, towards each other, forming a 'V' arrangement within the C. As shown in FIG. 1A, the seal 10 features a curved region 11, and two leg portions 12. Although the curved region 11 may be a circular arc, it is more preferably in the shape of a compound curve as illustrated. A bend 13 joins each leg portion 12 to an end of the curved region 11. Each leg portion 12 has at its free end a bend 14, which preferably forms a curved tip 15. The tips 15 are curled slightly away from one another by the shape of the bends 14, to widen the potential contact between the legs 12 from point-to-point to arc-to-arc when the seal 10 is compressed, which aids in preventing mismatch and asymmetrical compression. The seal 10 of FIG. 1A is in the form of a ring, with the curved region 11 disposed on the outside of the ring. This seal 10 is of the "internal pressure" type.

Figure 1B:
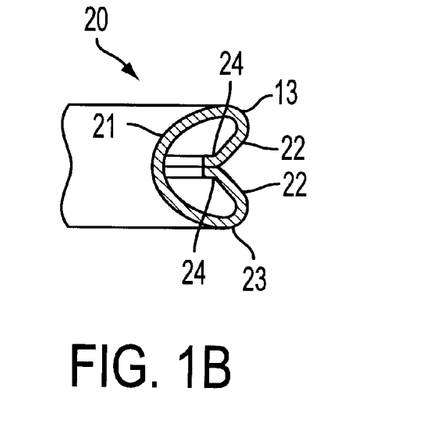
FIG. 1B is a side sectional cutaway view of another sealing ring according to a preferred embodiment of the present invention.

The seal 20 shown in FIG. 1B has a cross section similar to that shown in FIG. 1A, and includes a curved region 21, leg portions 22, bends 23 and 24, and tips 25. The seal 20 shown in FIG. 1B is in the form of a ring with the compound curve region 21 on the inside of the ring. This seal 20 is of the "external pressure" type.

Returning to FIG. 1A, the overall geometry of the cross-section is designed to promote elastic deflection and avoid crushing during compression of the sealing ring at installation. The legs 12, having impinged at their free ends, rotate as the seal is compressed until they approach a parallel or nearly parallel position, lying close together. From the above description of changes to the cross-section, it can be seen that, when viewed as circumferentially swept parts of an entire ring, the legs 12 are actually short frusto-conical discs, attached through acute bends 13 to the ends of the generally C-shaped toroidal compound curved portion 11. Each leg 12 forms a frusto-conical section, and functions similarly to a conical disk spring. When the included angle between the legs 12 is reduced during compression, the resulting reaction forces resemble those of conical disk springs, encastré at one limiting diameter and free at the other.

In contrast to the present invention, in the case of conventional sealing rings with a C-shaped cross-section, such as shown in FIGS. 2A and 2B, partial restoration of the height of the seals 1 and 2 as compression is removed is due to the conversion of strain energy retained only in those parts of the C-shaped seal section which remain elastic, acting against the restraining effects of the plastically deformed regions. However, in the present invention, by virtue of the legs 12, restoring forces from other parts of the seal are augmented by the conversion of strain energy stored in the largely elastic frusto-conical legs 12 of the seal. It will be apparent that the legs 12 provide a reduction in crushing and an increase in elastic deflection.

The angle at which the frusto-conical leg sections 12 are disposed relative to the plane of symmetry of the seal, or their included angle, can affect the maximization of springback. Although this angle may be varied to adjust the sealing force for load sensitive applications, the optimum angle for springback has been determined to preferably be approximately 45°, in the as manufactured (uncompressed) state. Depending in the specific application, this angle may vary and may be any suitable angle and still fall within the scope of the present invention.

The compound curve portion 11 may be designed to ensure the optimum distance between the loading and reaction contact points, for the purpose of maximizing elastic strain energy distribution. Preferably, the compound curve portion 11 of the sealing ring is therefore not truly semi-toroidal but may better be described as a quasi-toroidal segment. The bend radii (e.g., at bend 13 and bend 14 in FIG. 1A and bend 23 and bend 24 in FIG. 1B) may preferably be reduced to the greatest extent possible, in order to maximize the length of the conical segment 12.

An example of preferred embodiments having the shape shown in FIGS. 1A and 1B is a metallic sealing ring 10 with a cross-sectional free (uncompressed) height of 0.187 inches, with a material thickness of 0.017 inches. A typical material for such a ring would be Alloy 718 (i.e., Nickel Alloy 718, high temperature nickel-based superalloy 718, or Ni, Cr, Cb, Mo alloy 718). A typical diameter would lie between 4 and 30 inches. The springback of a seal of the shapes shown in FIGS. 1A and 2A after 20% compression at room temperature is 0.016 inches, whereas under the same conditions the prior art seals of FIGS. 2A and 2B spring back only 0.008 inches.

Figure 3:
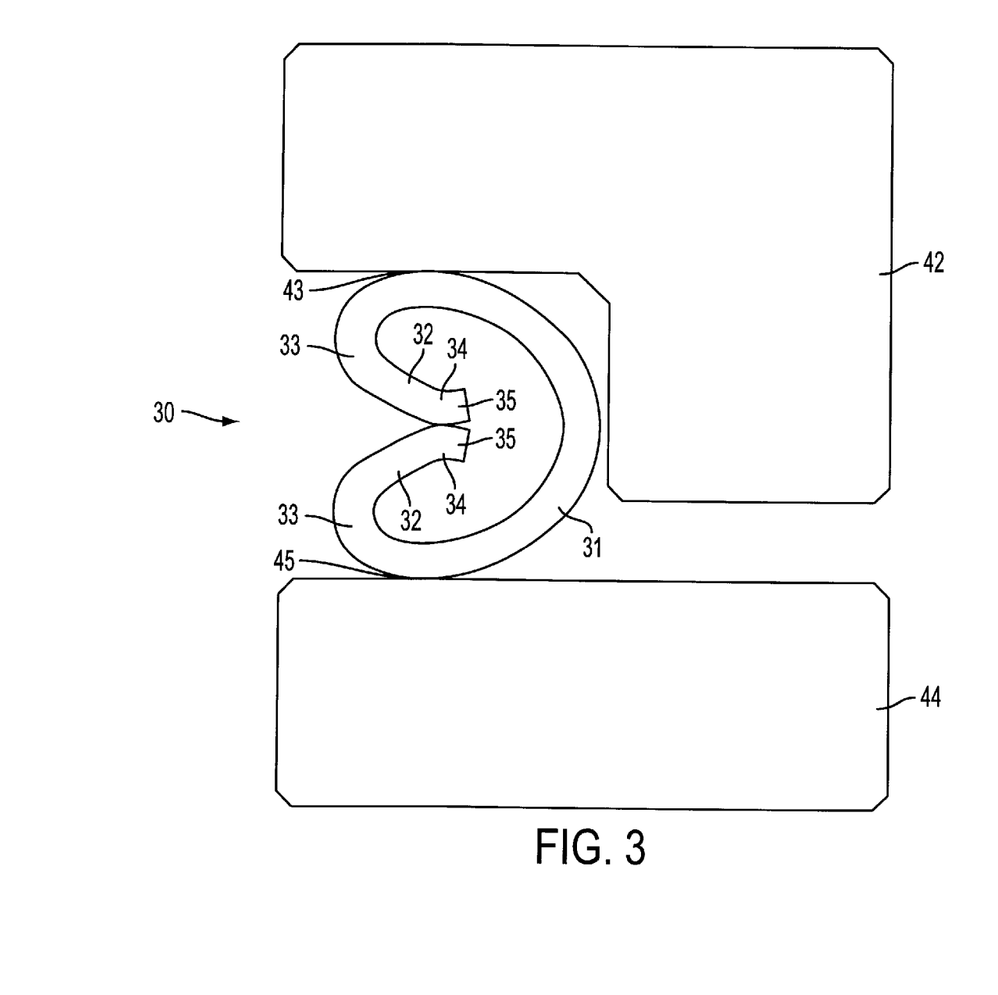
FIG. 3 is a side schematic representation of a sealing ring showing the sealing ring installed between two annular members and partially compressed.

FIG. 3 is a side sectional schematic view showing a seal 30 according to a preferred embodiment of the invention installed between an upper annular member 42 and a lower annular member 44. The seal 30 features a compound curved portion 31, legs 32, bends 33 and 34, and tips 35. The seal is shown partially compressed between the annular members 42 and 44, with sealing occurring at contact points 43 and 45.

Figure 4A:
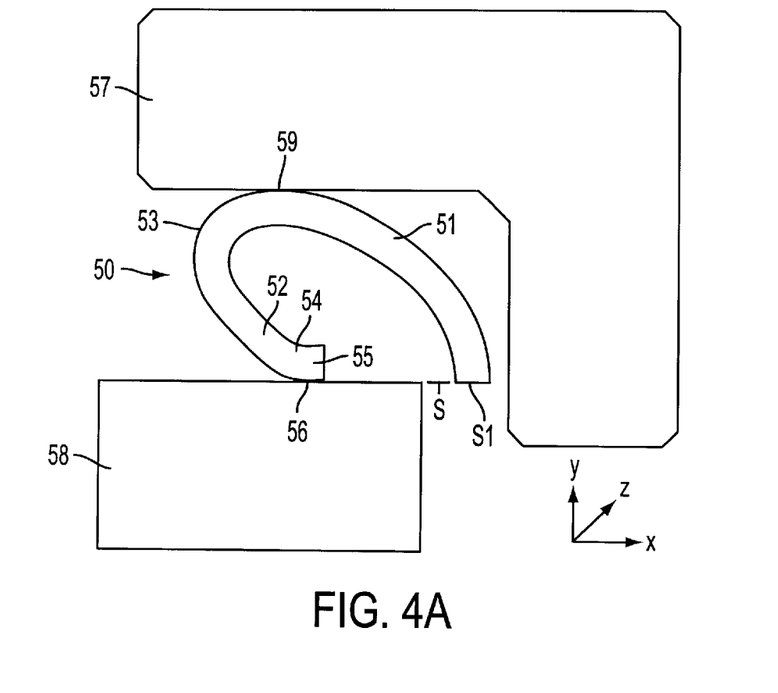
FIGS. 4A is a side schematic representation based on a computer model of a seal similar to that shown in FIG. 3, showing the seal before compression.
Figure 4B:
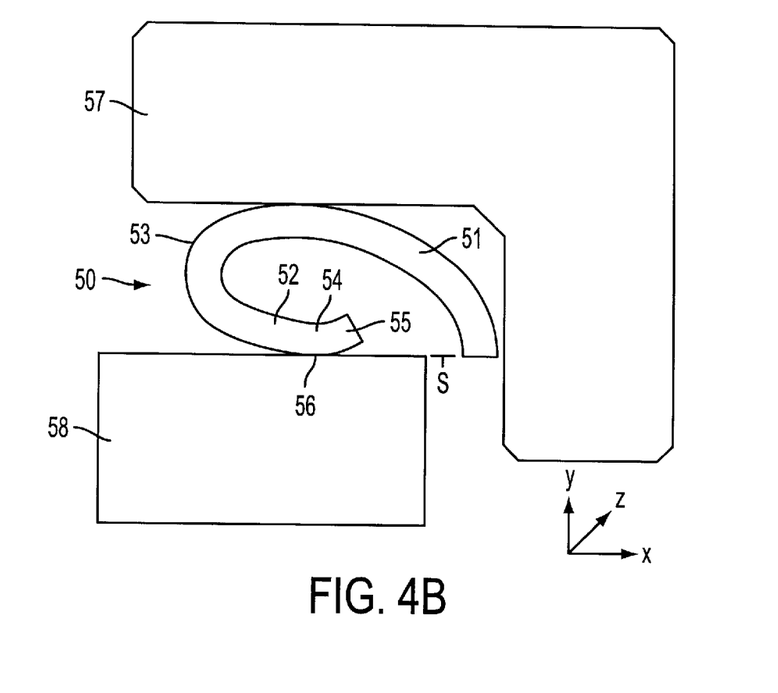
FIGS. 4B is a side schematic representation based on a computer model of a seal similar to that shown in FIG. 3, showing the seal after full compression.
Figure 4C:
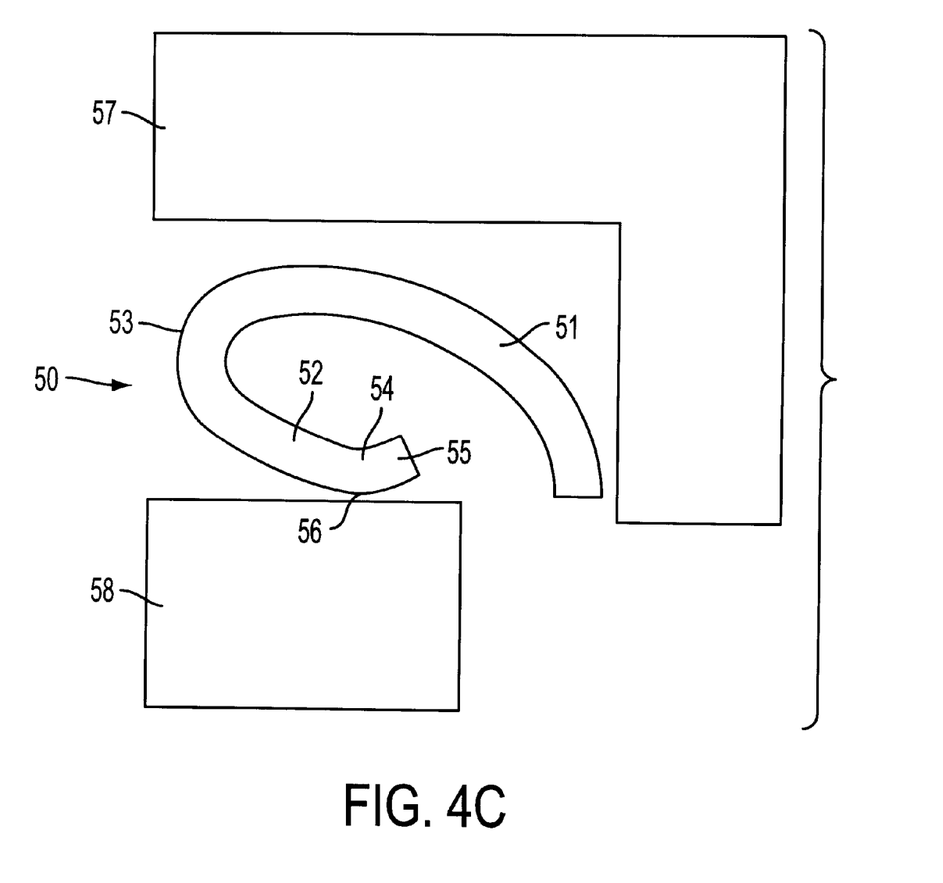
FIGS. 4C is a side schematic representation based on a computer model of a seal similar to that shown in FIG. 3, showing the seal after release from compression.

To illustrate the enhanced operation provided by the present invention, the seal 30 and enclosing annular components of FIG. 3 are described below using two different computer modeling simulations. FIGS. 4A through 4C are based on a half-section computer model of a seal 50 (similar to seal 30 of FIG. 3) and enclosed by annular components 57 and 58 (similar to components 42 and 44 shown in FIG. 3). FIGS. 5A through 5E are based on another computer model.

FIGS. 4A, 4B and 4C are schematics of a half-section Finite Element Model (F.E.M.) of a seal 50 according to a preferred embodiment of the invention, further illustrating the deformation characteristics of the seal 50. The model is based on axisymmetric nonlinear analysis by a Finite Element analysis method (F.E.A.). In FIGS. 4A, 4B and 4C, only a half of the sealing ring is depicted. The other half is not depicted in the F.E.M. because it is symmetrical about line S with the half shown. The upper annular member, or sealing cavity component, is represented by component 57 in FIGS. 4A, 4B and 4C, as a 2D model of a ring. A lower element 58 used in the F.E.M. represents the reaction forces from the lower leg (not shown) of the seal. All three components 50, 57 and 58 of this joint are treated as three dimensional objects in the axisyrnmetric analysis, since they represent surfaces which produce concentric volumes of revolution when rotated about a common axis located in the same 2D plane.

Line S denotes a line on the plane of symmetry for the complete part. Forces and moments on this cutting plane are mirrored in the two halves thus allowing a half model to represent the full part in a completely accurate analysis. The nodes on face S1 have only one degree of freedom in the x direction, which allows radial expansion of the seal ring as its height in the y direction is reduced. They are, therefore, fixed in y and z translation and against rotation in any direction.

Component 57 is constrained to be displaced in the −y direction, contacting the seal at point 59 where relative radial movement occurs as the seal is compressed. Friction forces normal to the interface surfaces at point 55 are computed during the analysis and added to the loading forces acting on the seal. Forces resulting from contact between the curved portion 51 at the centerline of the seal 50 and the body 57 adjacent to plane of the edge of the body 57 are also computed, when they occur, together with resultant tangential friction forces, and added to the loading forces for complete analysis.

Component 58 is modeled as an annular ring restrained against all movement to simulate line contact between the two legs 52 of the seal at point 56. Friction forces are not involved at this location since there is no relative radial or circumferential displacement between the ends of the two legs of the full seal cross-section.

FIG. 4B shows the seal 50 in a fully compressed, unpressurized state. The angle subtended between the conical leg surface 52 and the bisecting plane S has decreased from 41° to 9°. At this time, the sealing contact force, at point 59, is approximately 600 lbs. per inch of circumference, which may be compared to 300 lbs. per inch for a typical prior art C-Seal. This higher "seating force" results in lower leakage rates, and greater ability to deform seal coating materials such as silver or soft nickel, which are used to fill surface asperities and toolmarks in mating sealing surfaces which would otherwise create potential leakage paths.

FIG. 4C depicts the condition of the seal after it has been compressed and released, showing the seal 50 having partially recovered through springback the height lost during compression, after the deflecting force has been removed.

In the simulation illustrated in FIGS. 5A through 5E, a two-dimensional section is mathematically remodeled in the analysis pre-processor to represent a volume of revolution, in this case a quasi-toroidal shell of complex sectional form. As in the classical analysis used for FIGS. 4A through 4C, the body may be cut on the line of symmetry S of its cross-section to facilitate solution by reducing the number of equations to be solved. A clearance is provided between the upper solid ring 67 and the seal 60, in order to allow the computer to develop a mathematical relationship between these two parts before contact occurs. The lower solid ring 68 is fixed in the y direction in space, as is the cut surface 69 on the former centerline of the whole seal ring 60. All parts 60, 67, and 68 are permitted to expand radially, as are their physical counterparts. Interacting surfaces are also endowed with a friction coefficient to further simulate reality. The contact surfaces between the seal 60 and the lower ring 68 are not endowed with a friction coefficient, however, because relative translation does not occur at this interface.

Figure 5A:
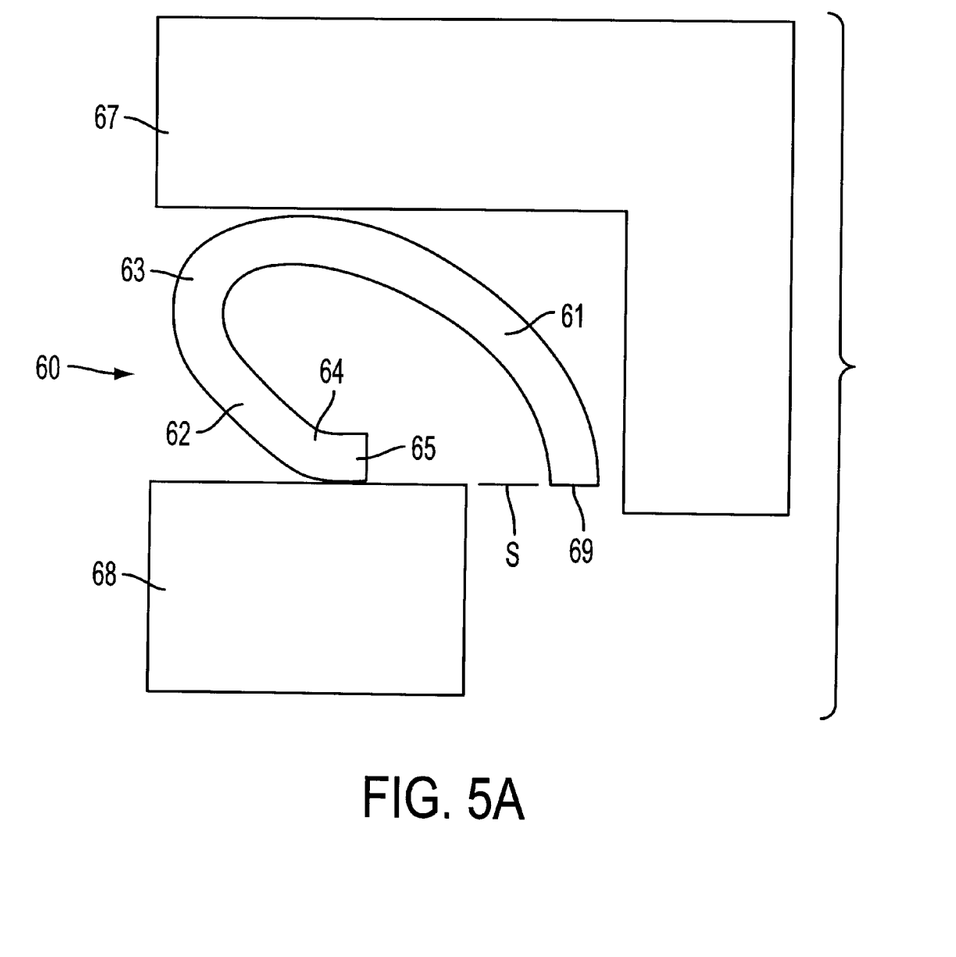
FIG. 5A is a side schematic representation based on a computer model of the seal shown in FIG. 3, before compression.
Figure 5B:
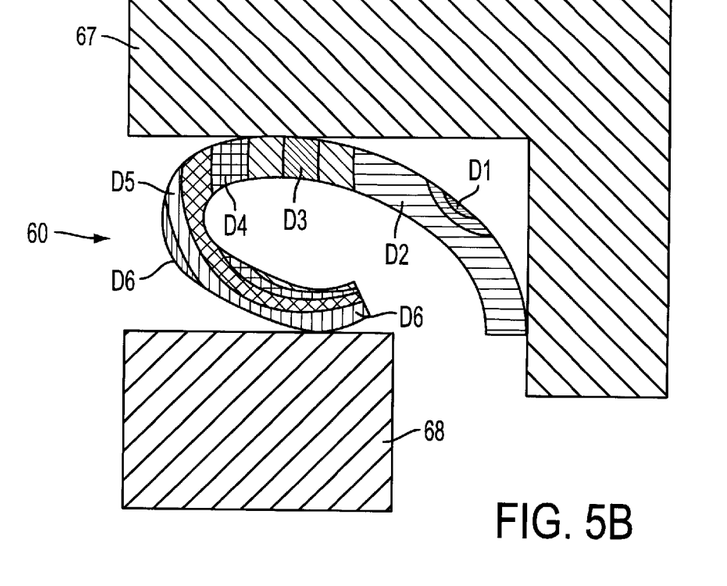
FIGS. 5B and 5C are side schematic representations based on a computer model of the seal shown in FIG. 3, after fill compression.
Figure 5C:
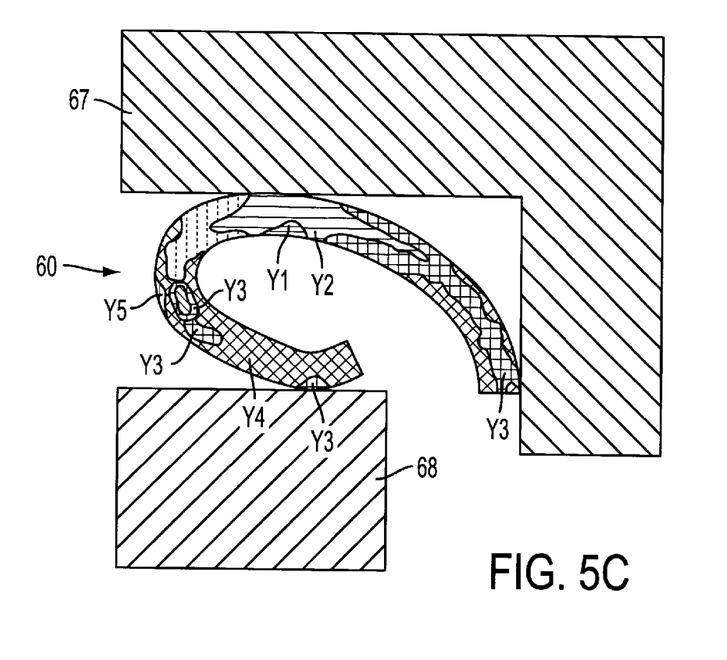

The angle at which the frusto-conical leg sections 12 are disposed relative to the plane of FIGS. 5B and 5C show plots of the model in which the upper block has been displaced relative to the fixed surface on the seal and the fixed lower block, by one-half of the amount of axial compression normally applied to the seal at installation, equivalent to full compression of the complete seal. FIG. 5B is a displacement plot, the contour markings on which describe the approximate amount of displacement as set forth in the following table. The values and contour lines in all the tables below are given only to represent the general relative displacement and/or stress values in an example only, and are not intended to be exact measurements.

| Contour Area | Approximate Displacement (inches) |
|---|---|
| D1 | less than 0.0038154 |
| D2 | less than 0.0114460 |
| D3 | less than 0.0190770 |
| D4 | less than 0.0228920 |
| D5 | less than 0.0267080 |
| D6 | less than 0.0305230 |

Similarly, FIG. 5C has contour markings showing stress distribution, using the von Mises strain-energy criterion for stress determination. The contour markings describe the approximate distribution of stress as set forth in the following table:

| Contour Area | Approximate Stress (pounds per sq. in.) |
|---|---|
| Y1 | less than 24107 |
| Y2 | less than 72322 |
| Y3 | less than 1.4464 E + 005 |
| Y4 | less than 1.6875 E + 005 |
| Y5 | less than 1.9286 E + 005 |

Figure 5D:
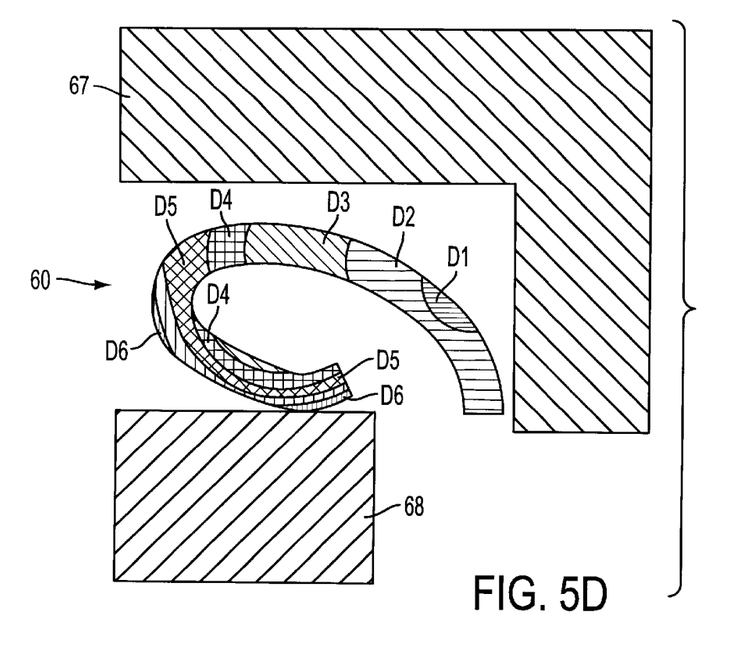
FIGS. 5D and 5E are side schematic representations based on a computer model of the seal shown in FIG. 3, after release from compression. before compression.
Figure 5E:
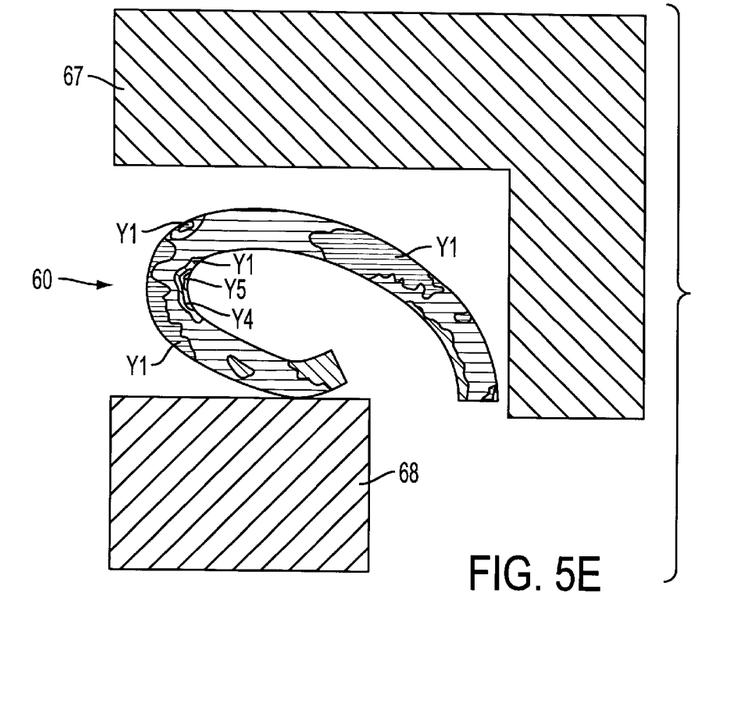

FIGS. 5D and 5E show the condition of the seal after "springback", in which the compression has been removed, allowing the forces due to the residual strain-energy stored in the seal to attain equilibrium. The shape of the seal is partially restored to its original configuration. FIG. 5D has displacement contours of this condition and FIG. 5E has contours of residual stresses. The contour markings on which describe the approximate amount of displacement in FIG. 5D are set forth in the following table.

| Contour Area | Approximate Displacement (inches) |
|---|---|
| D1 | less than 0.0045801 |
| D2 | less than 0.0068702 |
| D3 | less than 0.0114500 |

-continued

| Contour Area | Approximate Displacement (inches) |
| --- | --- |
| D4 | less than 0.0137400 |
| D5 | less than 0.0160300 |
| D6 | less than 0.0183210 |

The contour markings describe the approximate distribution of stress in FIG. 5E as set forth in the following table:

| Contour Area | Approximate Stress (pounds per sq. in.) |
| --- | --- |
| Y1 | less than 23713 |
| Y4 | less than 1.4228 E + 005 |
| Y5 | less than 1.8970 E + 005 |

The fact that only a very small area labeled Y5 in the contours in FIG. 5E shows residual stresses above the yield point (1.5E+005) of the material from which the seal is made is remarkable, because it explains the exceptionally high springback of the seal of the present invention.

The specific examples of measurements referred to herein are based on room temperature, ambient conditions. Actual applications will often involve elevated temperatures, at which the material properties are somewhat reduced. However, because Young's Modulus of Elasticity for the material is also inversely proportional to temperature, deflection stresses are also reduced at high temperature.

Figure 6A:
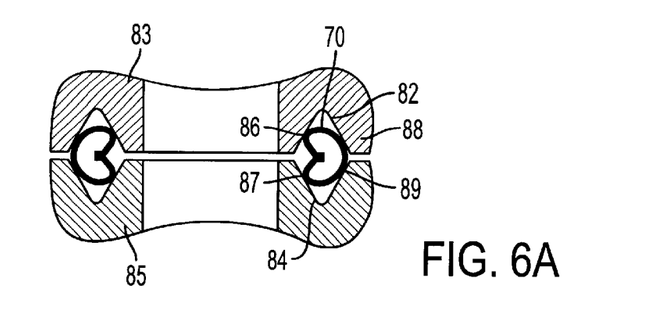
FIG. 6B is a side sectional view of a sealing ring installed in an opposing V-groove cavity after compression.
Figure 6B:
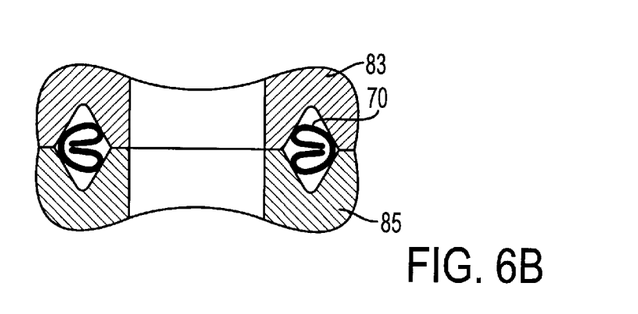

FIGS. 6A and 6B illustrate a sealing ring 70 according to a preferred embodiment of the invention, installed in an opposing V-groove, or double V-groove, cavity formed by a V-groove 82 in a flange or other annular member 83, and an opposing V-groove 84 in another flange or annular member 85. In this arrangement, the seal has four sealing surfaces at 86, 87, 88, and 89. Thus, the sealing ring forms two well-defined sealing circles in each of the two annular members. FIG. 6A shows the seal before compression, and FIG. 6 shows the seal after full compression. This produces a very effective sealing efficiency while still maintaining a high degree of elasticity.

Figure 7A:
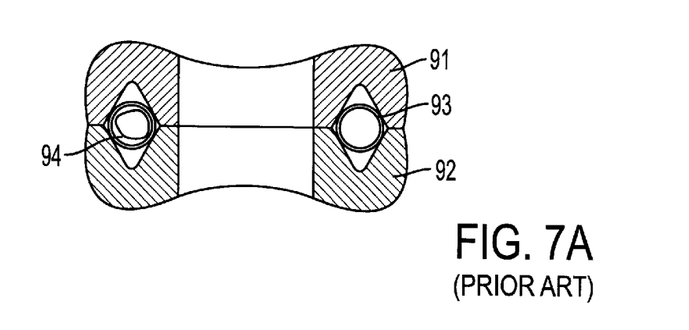
FIG. 7A is a side sectional view of a prior art O-ring type sealing ring installed in an opposing V-groove cavity after compression.

FIG. 7A shows a prior art metal O-ring seal 93 in the double V-groove application, between annular members 91 and 92. On the right side of the drawing, a portion of the O-ring seal 93 is shown having a relatively effective sealing shape. However, present O-ring seals are typically made from tubing formed into a circle, the ends of the tubing being flash-butt welded together. The left side of FIG. 7A shows a portion 94 of the seal where the weld is located. At the weld location, in practice, the outside of the seal may be undersized, creating a leakage path across the joint, where the contact of the seal with the groove faces does not form a perfect seal. Moreover, the inside of the seal is partially occluded by exuded weld metal, which can cause uneven flexing of the seal. Specifications for metal O-rings permit a radial reduction of the seal's cross-section up to 0.002 inches in the weld area. This is considerably more than any compensating change due to the reduction of compression in the reduced area, since the compression of adjacent areas also draws down the undercut area. Gaps in the sealing contact line forming leakage paths, remain therefore after compression of the seal.

Figure 7B:
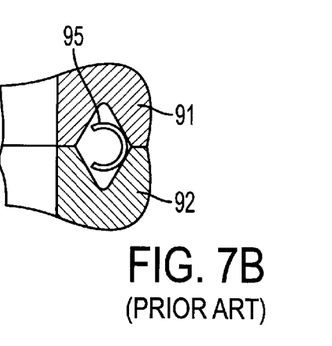
FIG. 7B is a partial side sectional view of a prior art C-shaped sealing ring installed in an opposing V-groove cavity after compression.

FIG. 7B shows a prior art C-shaped seal 95 installed between annular members 91 and 92. This seal has only two sealing circles total, one sealing line per groove in each annular member.

Figure 7C:
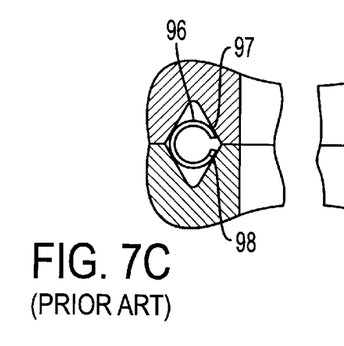
FIG. 7C is a partial side sectional view of a prior art extended-C-shaped sealing ring installed in an opposing V-groove cavity after compression.

FIG. 7C shows a prior art extended-C-shaped seal 96 installed between annular members 91 and 92. This seal has four sealing circles total, with primary sealing provided at points 97 and 98. Sealing lines 97 and 98 are on relatively unsupported cantilevered portions of the seal section, where the contact load generated is relatively low compared to the contact loads possible in the present invention.

The higher contact load available in the present invention provides improved sealing because leakage rates are improved by increased to sealing contact load.

Figure 8:
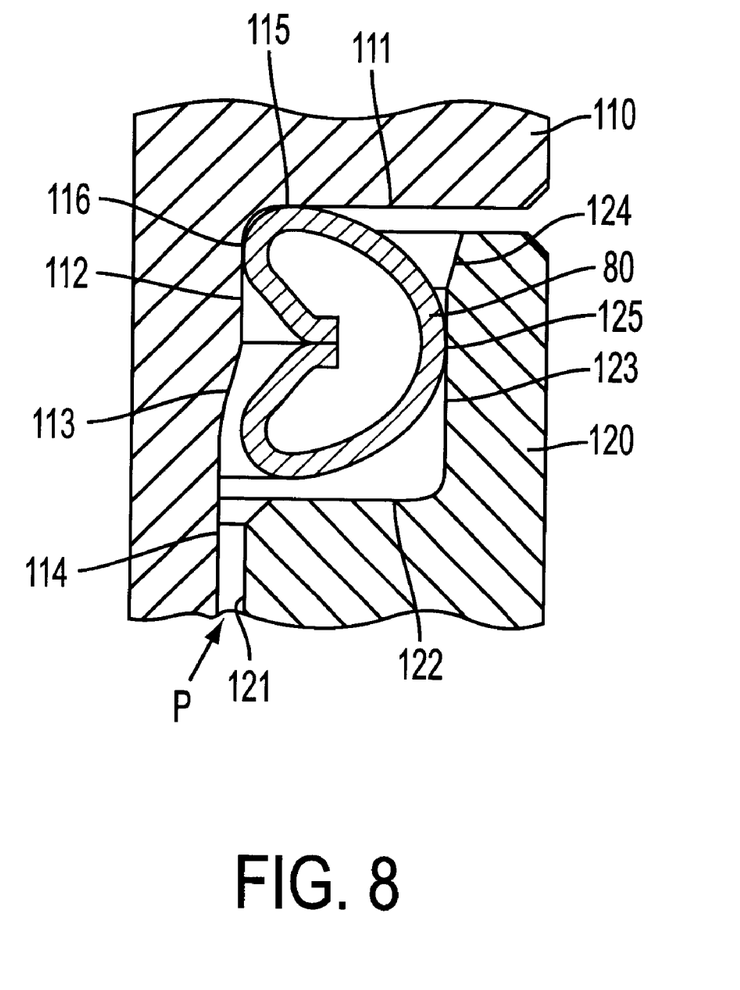
FIG. 8 is a cutaway side sectional view of a sealing ring installed between two annular members to form a co-axial seal.

Sealing rings according to the present invention have been shown in FIGS. 3 and 6 in exemplary applications where the seal is used as a "face seal" to seal between longitudinally spaced surfaces. These are merely examples, and other applications of seals according to the present invention are also advantageous. For example, seals according to the invention may also be used as a "coaxial seal" to seal between radially spaced surfaces. FIG. 8 shows a sealing ring 100 disposed in a cavity between two annular members 110 and 120 to form a coaxial seal. Member 110 has a top wall 111, a first side wall 116, a ramp 113 (which assists in installing the sealing ring) and a second side wall 114. Member 120 has a side wall 121, a lower wall 122, a side wall 123, and a ramp 124 (which also serves as an assembly aid for installing the sealing ring). When under positive pressure from the direction indicated by arrow P, the seal has three sealing surfaces at 115, 116 and 125 in this application.

While various embodiments have been described to illustrate the present invention, it will be understood by those skilled in the art that various modifications and changes can be made therein without departing from the scope of the invention as defined in the appended claims.

What is claimed is:

1. A method of using a sealing ring having a generally C-shaped cross section comprising the steps of:
   compressing the sealing ring; and
   providing springback to the sealing ring via frustro-conical spring members which extend generally radially inwards towards the inside of the ring C-shaped cross section of the seal so that springback is provided from energy stored by flexing of the frustro-conical spring members.

2. A method according to claim 1, wherein the frustro-conical spring members each form part of a leg region and the leg regions contact each other proximate the free ends of the leg regions.

3. A method according to claim 1, wherein the free ends of the leg regions each have a curved tip.

4. The method according to claim 1, further comprising the step of applying a pressure to the inner side of the C-shaped seal that is greater than a pressure on the outer side of the C-shaped seal to increase pressure sealing forces applied by the seal.

5. The method of claim 1, wherein the seal is a pressure-assisted seal.

* * * * *